(12) United States Patent
Wu

(10) Patent No.: US 9,784,908 B2
(45) Date of Patent: Oct. 10, 2017

(54) BACKLIGHT MODULE AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou (CN)

(72) Inventor: Chunming Wu, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 223 days.

(21) Appl. No.: 14/796,477

(22) Filed: Jul. 10, 2015

(65) Prior Publication Data

US 2016/0091658 A1 Mar. 31, 2016

(30) Foreign Application Priority Data

Sep. 26, 2014 (CN) .................. 2014 2 0561557 U

(51) Int. Cl.
*F21V 8/00* (2006.01)

(52) U.S. Cl.
CPC .......... *G02B 6/0088* (2013.01); *G02B 6/0065* (2013.01)

(58) Field of Classification Search
CPC .......................... G02B 6/0088; G02B 6/0065
See application file for complete search history.

(56) References Cited

U.S. PATENT DOCUMENTS

| 8,582,050 B2 * | 11/2013 | Li .................. G02F 1/133615 349/58 |
| 2012/0170311 A1 * | 7/2012 | Huang .................. G02B 6/0088 362/611 |

FOREIGN PATENT DOCUMENTS

JP            2002156632 A * 5/2002

* cited by examiner

*Primary Examiner* — Mary Ellen Bowman
(74) *Attorney, Agent, or Firm* — Harness, Dickey & Pierce, P.L.C.

(57) ABSTRACT

The present disclosure provides a backlight module and a display device. The backlight module includes a back plate, a light-guiding plate arranged on the back plate, and an elastic member arranged between a lateral edge of the back plate and a corresponding lateral edge of the light-guiding plate. The elastic member includes a body connected to the back plate, and a positioning member connected to the body and positioning the light-guiding plate.

14 Claims, 2 Drawing Sheets

BACKLIGHT MODULE AND DISPLAY DEVICE

CROSS-REFERENCE TO RELATED APPLICATION

The present application claims a priority of the Chinese patent application No. 201420561557.8 filed on Sep. 26, 2014, which is incorporated herein by reference in its entirety.

TECHNICAL FIELD

The present disclosure relates to the field of manufacture of liquid crystal products, in particular to a backlight module and a display device.

BACKGROUND

As one of the key components of a liquid crystal display panel, a backlight module includes a light strip, a back plate, a bezel, and a light-guiding plate. The light-guiding plate is arranged on the back plate, the bezel surrounds the light-guiding plate and is clamped onto the back plate. The light strip is arranged on the back plate and opposite to the light-guiding plate. Because the light-guiding plate may expand with heat and contract with cold, a liquid crystal module will be damaged when the light strip or the liquid crystal module is pressed by the light-guiding plate, which results in imperfect optical performance. During the design, it is required to provide a certain gap so as to ensure reliable stability. However, due to the gap, the reliability of products is usually not good, and in a vibration test, a high temperature and humidity test or a high and low temperature test, usually such defects as white spot, scratch and warpage will occur.

SUMMARY

An object of the present disclosure is to provide a backlight module and a display device, so as to position a light-guiding plate in an appropriate and effective manner, thereby to prevent occurrence of warpage due to expansion of the light-guiding plate.

In one aspect, the present disclosure provides in one embodiment a backlight module, including a back plate, a light-guiding plate arranged on the back plate, and an elastic member arranged between a lateral edge of the back plate and a corresponding lateral edge of the light-guiding plate. The elastic member includes a body connected to the back plate, and a positioning member connected to the body and positioning the light-guiding plate.

Further, there are at least two elastic members arranged at a corner of the back plate; the elastic members clamp two lateral edges of the light-guiding plate corresponding to two adjacent lateral edges forming the corner of the back plate so as to position the light-guiding plate.

Further, the body includes a first connector and a second connector connected to the two adjacent lateral edges forming the corner of the back plate, respectively. The positioning member includes a first clamping member connected to the first connector and a second clamping member connected to the second connector. The first clamping member and the second clamping member apply forces to the two lateral edges of the light-guiding plate corresponding to the two adjacent lateral edges forming the corner of the back plate, respectively, so as to clamp the light-guiding plate.

Further, the first clamping member is a first columnar protrusion protruding from the first connector, and the second clamping member is a second columnar protrusion protruding from the second connector. Ends of the first columnar protrusion and the second columnar protrusion apply forces to the two lateral edges of the light-guiding plate corresponding to the two adjacent lateral edges forming the corner of the back plate, respectively, so as to clamp the light-guiding plate.

Further, there are a plurality of first columnar protrusions and a plurality of second columnar protrusions.

Further, the first clamping member is a first annular protrusion protruding from the first connector, and the second clamping member is a second annular protrusion protruding from the second connector. An outer surface of the first annular protrusion and an outer surface of the second annular protrusion are configured to apply forces to the two lateral edges of the light-guiding plate corresponding to the two adjacent lateral edges forming the corner of the back plate, respectively, so as to clamp the light-guiding plate.

Further, there are a plurality of first annular protrusions and a plurality of second annular protrusions.

Further, there is a plurality of elastic members. At least one of the elastic members is arranged at a first edge of the back plate, and at least one of the elastic members is arranged at a second edge of the back plate adjacent to the first edge. The elastic members cooperate with each other, and apply forces to two edges of the light-guiding plate corresponding to the first edge and the second edge, respectively, so as to position the light-guiding plate.

Further, there is one elastic member, the body is an annular structure of a shape matching with a shape of the back plate, and at least two positioning members are arranged on the body. The at least two positioning members are arranged at a corner of the back plate, or one of the at least two positioning members is arranged at a first edge of the back plate, and the other one of the at least two positioning members is arranged at a second edge of the back plate adjacent to or opposite to the first edge.

In another aspect, the present disclosure provides in one embodiment a backlight module, including a back plate, a light-guiding plate arranged on the back plate, and an elastic member arranged between the back plate and the light-guiding plate. The elastic member includes a body in contact with the back plate, and a positioning member protruding from the body and contacting with the light-guiding plate.

Further, the body is in contact with a lateral edge of the back plate, and the positioning member is in contact with a lateral edge of the light-guiding plate corresponding to the lateral edge of the back plate.

Further, the body is of an L shape, and includes a first connector and a second connector connected to the first connector. The first connector and the second connector are in contact with lateral edges of the back plate, respectively. The positioning member includes a first clamping member connected to the first connector and a second clamping member connected to the second connector. The first clamping member and the second clamping member are in contact with two lateral edges of the light-guiding plate, respectively.

Further, the first clamping member is a protrusion protruding from the first connector, and the second clamping member is a protrusion protruding from the second connector.

Further, the first clamping member and the second clamping member are both hollow protrusions.

Further, the body is connected to the back plate by clamping or riveting.

Further, the elastic member is formed integrally with the back plate by injection molding.

In yet another aspect, the present disclosure provides in one embodiment a display device including the above-mentioned backlight module.

DETAILED DESCRIPTION

The present disclosure will be described hereinafter in conjunction with the drawings and embodiments. The following embodiments are merely for illustrative purposes, but shall not be used to limit the scope of the present disclosure.

As shown in FIGS. 1-4, the present disclosure provides in one embodiment a backlight module, which includes a back plate 1, a light-guiding plate 2 arranged on the back plate 1, and an elastic member 3 arranged between a lateral edge of the back plate 1 and a corresponding lateral edge of the light-guiding plate 2 and positioning the light-guiding plate 2. The elastic member 3 includes a body connected to the back plate 1, and a positioning member connected to the body and positioning the light-guiding plate 2.

The presence of the elastic member 3 can position the light-guiding plate 2 in an appropriate and effective manner, thereby to prevent the occurrence of warpage due to the expansion of the light-guiding plate.

The elastic member 3 may be provided in various forms, and may be connected to the back plate 1 in various ways, as long as it is able to position the light-guiding plate 2 and prevent the occurrence of warpage due to the expansion of the light-guiding plate. Some forms of the elastic member 3 will be described hereinafter.

The elastic member 3 may be directly connected to the back plate 1 by clamping or riveting, etc. Meanwhile, the back plate 1 is provided with a connection member matching with the elastic member 3, so as to facilitate the replacement of the elastic member 3. In one embodiment, the elastic member 3 is formed integrally with the back plate 1 by injection molding, so as to reduce the production cost.

There may be one or more elastic members 3, depending on actual sizes of the light-guiding plate 2 and the back plate 1.

In one embodiment, there are at least two elastic members 3 arranged at a corner of the back plate 1, so as to position the light-guiding plate 2 by clamping two lateral edges of the light-guiding plate 2 which are corresponding to two adjacent lateral edges forming the corner of the back plate 1.

The back plate 1 includes four corners. The elastic members 3 may be arranged in at least two corners. In this embodiment, there are two elastic members 3. In order to prevent the warpage due to the expansion of the light-guiding plate 2, the elastic members 3 may be arranged at two corners located at an identical side of the back plate 1 or located diagonally on the back plate 1.

Figure 1:
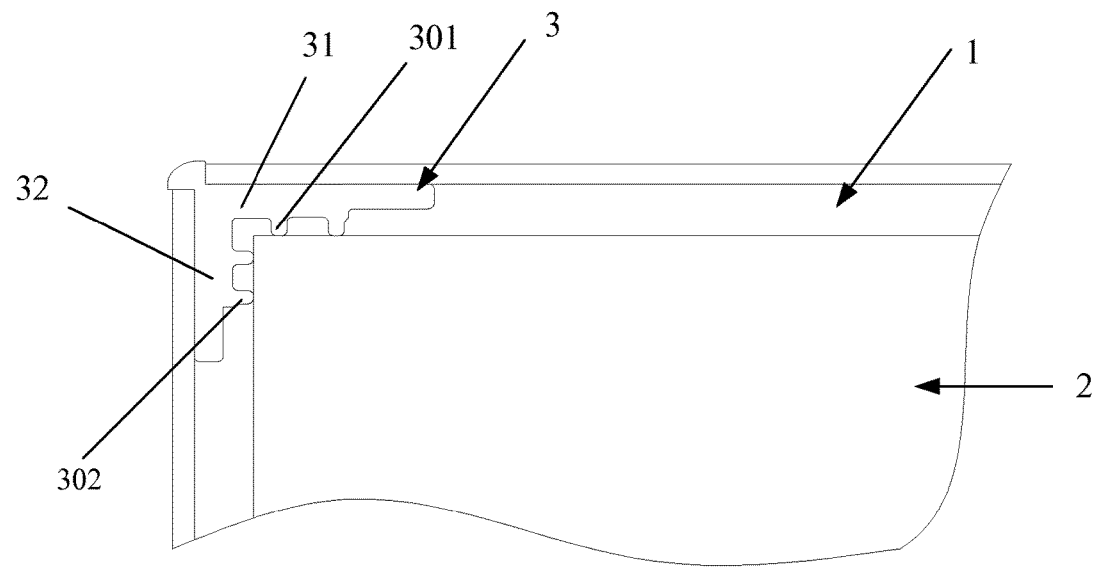
FIG. 1 is a schematic view showing a backlight module according to one embodiment of the present disclosure.

As shown in FIG. 1, alternatively, the body includes a first connector 31 and a second connector 32 which are connected to two adjacent lateral edges forming one corner of the back plate 1, respectively. The positioning member includes a first clamping member 301 connected to the first connector 31 and a second clamping member 302 connected to the second connector 32. The first clamping member 301 and the second clamping member 302 apply forces to the two lateral edges of the light-guiding plate 2 which are corresponding to the two adjacent lateral edges forming the corner of the back plate 1, respectively, so as to clamp the light-guiding plate 2.

The first clamping member 301 and the second clamping member 302 may be provided in various forms, as long as the light-guiding plate 2 can be clamped elastically by them. Alternatively, the first clamping member 301 is a first columnar protrusion protruding from the first connector 31, and the second clamping member 302 is a second columnar protrusion protruding from the second connector 32. Ends of the first columnar protrusion and the second columnar protrusion apply forces to the two lateral edges of the light-guiding plate 2 which are corresponding to the two adjacent lateral edges forming the corner of the back plate 1, respectively, so as to clamp the light-guiding plate 2.

Further, there are a plurality of first columnar protrusions and a plurality of second columnar protrusions. As shown in FIG. 1, in this embodiment, there are two first columnar protrusions and two second columnar protrusions.

Figure 2:
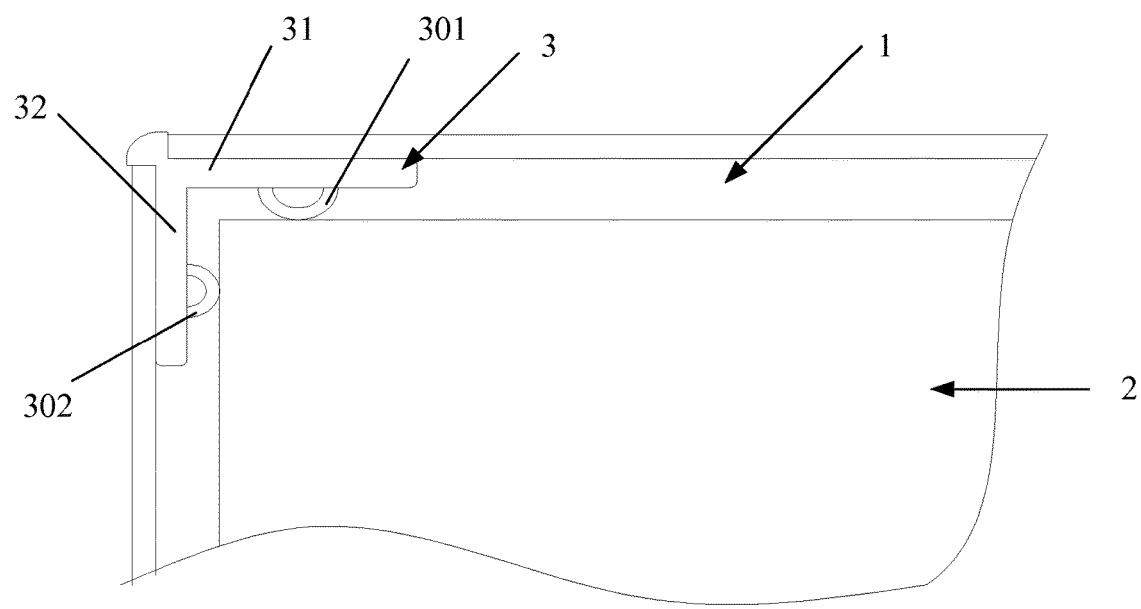
FIG. 2 is another schematic view showing the backlight module according to one embodiment of the present disclosure.

Alternatively, as shown in FIG. 2, the first clamping member 301 is a first annular protrusion protruding from the first connector 31, and the second clamping member 302 is a second annular protrusion protruding from the second connector 32. An outer surface of the first annular protrusion and an outer surface of the second annular protrusion apply forces to the two lateral edges of the light-guiding plate 2 which are corresponding to the two adjacent lateral edges forming the corner of the back plate 1, respectively, so as to clamp the light-guiding plate 2.

Due to hollow structures of the first annular protrusion and the second annular protrusion, it is able to increase their deformation amount, thereby to prevent the warpage due to the expansion of the light-guiding plate 2 in a more effective manner.

In this embodiment, there are one first annular protrusion and one second annular protrusion. Of course, the number of the first annular protrusions and the second annular protrusions may be set in accordance with actual sizes of the light-guiding plate 2 and the back plate 1.

The elastic member 3 may be arranged at the corner of the back plate 1, and the body formed by the first connector 31 and the second connector 32 is of a shape matches with a shape of the corresponding corner of the back plate 1. It should be appreciated that, the number, the positions and the forms of the elastic members 3 are not limited to the above.

Figure 3:
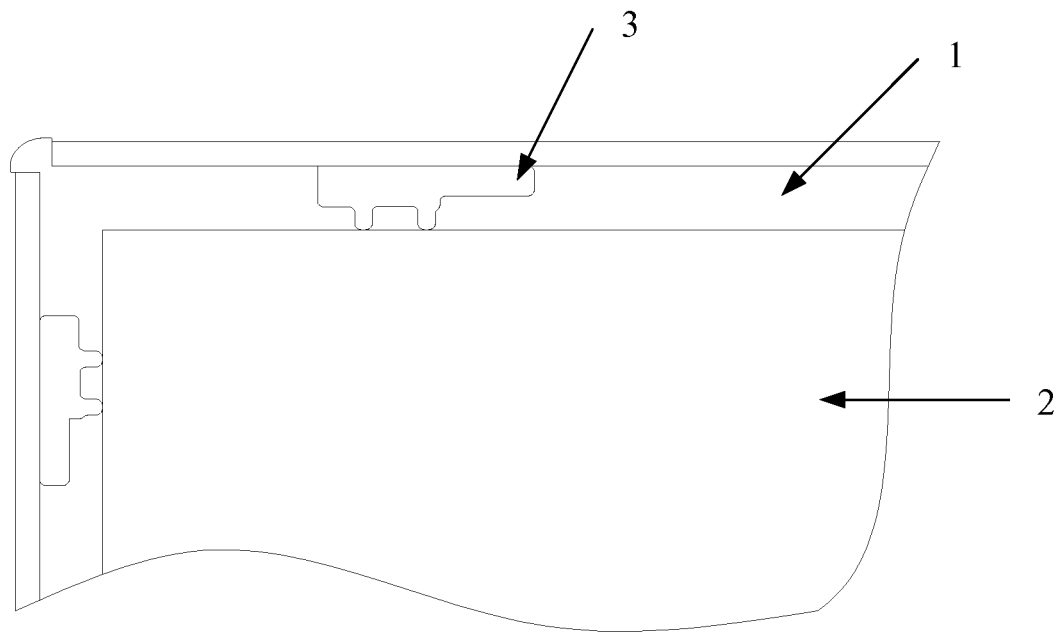
FIG. 3 is yet another schematic view showing the backlight module according to one embodiment of the present disclosure.

As shown in FIG. 3, in another embodiment, there is a plurality of elastic members 3. At least one of the elastic members 3 is arranged at a first edge of the back plate 1, and at least one of the elastic members 3 is arranged at a second edge of the back plate 1 adjacent to the first edge. The elastic members 3 cooperate with each other, and apply forces to two edges of the light-guiding plate 2 which are corresponding to the first edge and the second edge, respectively, thereby to position the light-guiding plate 2.

The elastic member 3 includes the body connected to the back plate 1 and the positioning member protruding from the body. There may be one or more positioning members, and the positioning member may be a columnar protrusion or an annular protrusion. A length of the body, i.e., the length of the body in a lengthwise direction of the corresponding lateral edge of the back plate 1, may be set in accordance with the practical need.

Figure 4:
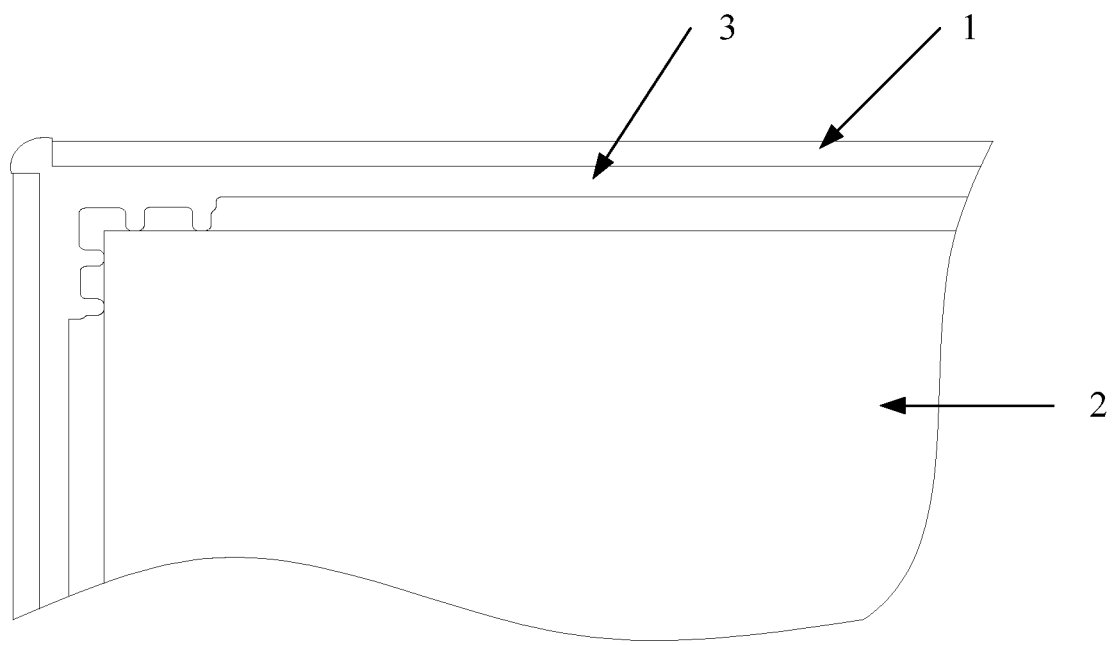
FIG. 4 is still yet another schematic view showing the backlight module according to one embodiment of the present disclosure.

As shown in FIG. 4, in yet another embodiment, in case that the back plate 1 and the light-guiding plate 2 are each of a small size, there is only one elastic member 3, the body is of an annular structure having a shape matching with a shape of the back plate 1, and there are at least two positioning members on the body. The at least two positioning members are arranged at a corner of the back plate 1, or one of the at least two positioning members is arranged at a first edge of the back plate 1, and the other one of the at least two positioning members is arranged at a second edge of the back plate 1 adjacent to or opposite to the first edge.

In this embodiment, the elastic member 3 is made of, but not limited to, rubber.

The present disclosure further provides in one embodiment a display device including the above-mentioned backlight module.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A backlight module, comprising a back plate, a light-guiding plate arranged on the back plate, and an elastic member arranged between a lateral edge of the back plate and a corresponding lateral edge of the light-guiding plate;
   wherein the elastic member comprises a body connected to the back plate, and a positioning member connected to the body and positioning the light-guiding plate,
   the body comprises a first connector and a second connector connected to the two adjacent lateral edges forming the corner of the back plate, respectively; the positioning member comprises a first clamping member connected to the first connector and a second clamping member connected to the second connector; the first clamping member and the second clamping member apply forces to the two lateral edges of the light-guiding plate corresponding to the two adjacent lateral edges forming the corner of the back plate, respectively, so as to clamp the light-guiding plate,
   the first clamping member is a first columnar protrusion protruding from the first connector; the second clamping member is a second columnar protrusion protruding from the second connector; ends of the first columnar protrusion and the second columnar protrusion apply forces to the two lateral edges of the light-guiding plate corresponding to the two adjacent lateral edges forming the corner of the back plate, respectively, so as to clamp the light-guiding plate.

2. The backlight module according to claim 1, wherein there are at least two elastic members arranged at a corner of the back plate; the elastic members clamp two lateral edges of the light-guiding plate which are corresponding to two adjacent lateral edges forming the corner of the back plate to position the light-guiding plate.

3. The backlight module according to claim 1, wherein there are a plurality of first columnar protrusions and a plurality of second columnar protrusions.

4. The backlight module according to claim 1, wherein the first clamping member is a first annular protrusion protruding from the first connector; the second clamping member is a second annular protrusion protruding from the second connector; an outer surface of the first annular protrusion and an outer surface of the second annular protrusion apply forces to the two lateral edges of the light-guiding plate corresponding to the two adjacent lateral edges forming the corner of the back plate, respectively, so as to clamp the light-guiding plate.

5. The backlight module according to claim 4, wherein there are a plurality of first annular protrusions and a plurality of second annular protrusions.

6. The backlight module according to claim 1, wherein there is a plurality of elastic members; at least one of the elastic members is arranged at a first edge of the back plate; at least one of the elastic members is arranged at a second edge of the back plate adjacent to the first edge; the elastic members cooperate with each other and apply forces to two edges of the light-guiding plate corresponding to the first edge and the second edge, respectively, so as to position the light-guiding plate.

7. The backlight module according to claim 1, wherein there is one elastic member; the body is an annular structure of a shape matching with a shape of the back plate; at least two positioning members are arranged on the body;
   the at least two positioning members are arranged at a corner of the back plate, or
   one of the at least two positioning members is arranged at a first edge of the back plate, and the other one of the at least two positioning members is arranged at a second edge of the back plate adjacent to or opposite to the first edge.

8. A display device, comprising the backlight module according to claim 1.

9. A backlight module, comprising a back plate, a light-guiding plate arranged on the back plate, and an elastic member arranged between the back plate and the light-guiding plate;
   wherein the elastic member comprises a body in contact with the back plate, and a positioning member protruding from the body and contacting the light-guiding plate
   the body is of an L shape and comprises a first connector and a second connector connected to the first connector; the first connector and the second connector are in contact with lateral edges of the back plate, respectively;
   the positioning member comprises a first clamping member connected to the first connector and a second clamping member connected to the second connector; the first clamping member and the second clamping member are in contact with two lateral edges of the light-guiding plate, respectively,
   the first clamping member is a protrusion protruding from the first connector, and the second clamping member is a protrusion protruding from the second connector.

10. The backlight module according to claim 9, wherein the body is in contact with a lateral edge of the back plate; the positioning member is in contact with a lateral edge of the light-guiding plate corresponding to the lateral edge of the back plate.

11. The backlight module according to claim 9, wherein the first clamping member and the second clamping member are both hollow protrusions.

12. The backlight module according to claim 9, wherein the body is connected to the back plate by clamping or riveting.

13. The backlight module according to claim 9, wherein the elastic member is formed integrally with the back plate by injection molding.

14. A display device, comprising the backlight module according to claim 9.

* * * * *